US011171372B2

United States Patent
Pucher et al.

(10) Patent No.: US 11,171,372 B2
(45) Date of Patent: Nov. 9, 2021

(54) COOLANT DISTRIBUTOR

(71) Applicant: Samsung SDI Co., Ltd., Yongin-si (KR)

(72) Inventors: Matthias Pucher, Graz (AT); Carl-Michael Masaryk, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 16/960,854

(22) PCT Filed: Mar. 27, 2019

(86) PCT No.: PCT/KR2019/003582
§ 371 (c)(1),
(2) Date: Jul. 8, 2020

(87) PCT Pub. No.: WO2019/198952
PCT Pub. Date: Oct. 17, 2019

(65) Prior Publication Data
US 2021/0013565 A1    Jan. 14, 2021

(30) Foreign Application Priority Data

Apr. 9, 2018   (EP) .................................... 18166272

(51) Int. Cl.
*H01M 10/6568*   (2014.01)
*H01M 10/6554*   (2014.01)
(Continued)

(52) U.S. Cl.
CPC ... *H01M 10/6568* (2015.04); *H01M 10/6554* (2015.04); *H01M 50/20* (2021.01);
(Continued)

(58) Field of Classification Search
CPC ......... H01M 10/6568; H01M 10/6554; H01M 2/1016; H01M 10/625; H01M 10/613;
(Continued)

(56) References Cited

U.S. PATENT DOCUMENTS

| 6,255,015 B1 | 7/2001 | Corrigan et al. |
| 7,547,487 B1 | 6/2009 | Smith et al. |

(Continued)

FOREIGN PATENT DOCUMENTS

| CN | 104756279 A | 7/2015 |
| CN | 107112612 A | 8/2017 |

(Continued)

OTHER PUBLICATIONS

Extended European Search Report for corresponding European Application No. 18166272.7, dated Nov. 7, 2018, 11 pp.

(Continued)

*Primary Examiner* — Lingwen R Zeng
(74) *Attorney, Agent, or Firm* — Lewis Roca Rothgerber Christie LLP

(57) ABSTRACT

The present invention refers to a coolant distributor for a battery module housing with a hollow profile enclosing a coolant channel and a plurality of coolant junctions, each extending through a first portion of the hollow profile and providing a fluid connection between the coolant channel and a coolant port. The invention further relates to a battery module housing with a bottom plate comprising a plurality of embedded coolant ducts and a coolant distributor according to the invention that is welded to the bottom plate, such that each of the plurality of coolant ports is aligned with one of a plurality of inlet openings of the coolant ducts. The present invention further relates to a battery system housing, comprising a plurality of battery module housings according to the invention and a plurality of pipe couplings for
(Continued)

interconnecting adjacent battery module housings, and to the pipe coupling.

17 Claims, 11 Drawing Sheets

(51) Int. Cl.
| | | |
|---|---|---|
| *H01M 2/10* | (2006.01) | |
| *H01M 50/20* | (2021.01) | |
| *H01M 10/625* | (2014.01) | |
| *H01M 10/6567* | (2014.01) | |
| *H01M 10/613* | (2014.01) | |
| *H01M 10/6556* | (2014.01) | |

(52) U.S. Cl.
CPC ........ *H01M 10/613* (2015.04); *H01M 10/625* (2015.04); *H01M 10/6556* (2015.04); *H01M 10/6567* (2015.04); *H01M 2220/20* (2013.01); *Y02E 60/10* (2013.01)

(58) Field of Classification Search
CPC ......... H01M 10/6556; H01M 10/6567; H01M 2220/20; H01M 50/20; Y02E 60/10
See application file for complete search history.

(56) References Cited

U.S. PATENT DOCUMENTS

| | | |
|---|---|---|
| 8,889,283 B2 | 11/2014 | Marchio et al. |
| 2012/0107664 A1 | 5/2012 | Lee et al. |
| 2014/0050952 A1 | 2/2014 | Merriman et al. |
| 2014/0234687 A1 | 8/2014 | Fuhr et al. |
| 2015/0207187 A1* | 7/2015 | Beltz ..................... F28F 9/0256 165/181 |
| 2016/0190664 A1 | 6/2016 | Frohnmayer et al. |
| 2016/0204486 A1 | 7/2016 | Kenney et al. |
| 2017/0237130 A1 | 8/2017 | Kim et al. |
| 2018/0320996 A1* | 11/2018 | Tatarinov .............. F28F 9/0248 |
| 2019/0207280 A1 | 7/2019 | Kenney et al. |

FOREIGN PATENT DOCUMENTS

| | | |
|---|---|---|
| DE | 10 2012 009 492 A1 | 11/2013 |
| JP | 2002-523873 A | 7/2002 |
| JP | 2007-538373 A | 12/2007 |
| JP | 2008-192381 A | 8/2008 |
| JP | 2009-85289 A | 4/2009 |
| JP | 2013-500570 A | 1/2013 |
| JP | 2017-532720 A | 11/2017 |
| KR | 10-2011-0011068 A | 2/2011 |
| KR | 10-2013-0113740 A | 10/2013 |
| KR | 10-2014-0037351 A | 3/2014 |
| KR | 10-2015-0074384 A | 7/2015 |
| KR | 10-2017-0020103 A | 2/2017 |
| KR | 10-1800067 B1 | 11/2017 |
| WO | WO 2000011730 A1 | 3/2000 |
| WO | WO 2016/109881 A1 | 7/2016 |

OTHER PUBLICATIONS

Japanese Office Action dated Mar. 8, 2021, corresponding to Japanese Application No. 2020-545544, 6 pages.

Chinese Office Action dated Mar. 25, 2021, with accompanying Search Report, corresponding to Chinese Patent Application No. 201980022916.8, 13 pages.

* cited by examiner

COOLANT DISTRIBUTOR

CROSS-REFERENCE TO RELATED APPLICATION(S)

This application is a National Phase Patent Application of International Patent Application Number PCT/KR2019/003582, filed on Mar. 27, 2019, which claims priority of European Patent Application No. 18166272.7, filed Apr. 9, 2018. The entire contents of all of which are incorporated herein by reference.

TECHNICAL FIELD

The present invention relates to a coolant distributor for a battery module, to a battery module housing comprising such coolant distributor and to methods for making such coolant distributor and such battery module housing. The present invention further relates to a battery system housing comprising a plurality of battery module housings according to the invention and a plurality of pipe couplings for interconnecting the plurality of battery module housings.

BACKGROUND ART

A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g. cylindrical or rectangular, depends on the battery's intended purpose.

Rechargeable batteries may be used as a battery module formed of a plurality of unit battery cells coupled in series and/or in parallel so as to provide a high energy density, e.g. for motor driving of a hybrid vehicle. That is, the battery module is formed by interconnecting the electrode terminals of the plurality of unit battery cells depending on a required amount of power and in order to realize a high-power rechargeable battery, e.g. for an electric vehicle.

Mechanical integration of a battery module can be achieved by providing a battery module housing with a bottom plate and by positioning individual battery cells or submodules thereon. The cells may be further confined by fastening side plates to lateral sides of the carrier plate and a cover plate may be fixed to the carrier plate and/or to the side plates for constructing a multilevel battery module.

To provide thermal control of a battery system a thermal management system is required to safely use the at least one battery module by efficiently emitting, discharging and/or dissipating heat generated from its rechargeable batteries. The thermal management system usually includes a closed cooling circuit, means for pumping a cooling medium through the cooling circuit, thermal sensors and regulation means for controlling the cooling or heating of the battery system, in particular the battery modules. The cooling circuit may involve construction elements like distributers, connectors, cooling channels or cooling tubes, which are usually stacked together during the manufacturing process of the battery system.

However, since liquid cooling media, such as water or alkanols, may conduct electricity, initiate corrosive processes or react with compounds of the battery cells located inside the battery module housing if coming into contact with them, this results in a high risk of leakage. Known technical solutions suffer from having a high number of interfaces in the cooling circuit and hence leaking tightness of the known cooling circuits may be critical at each interface.

DISCLOSURE

Technical Problem

It is thus an object of the present invention to overcome or reduce at least some of the drawbacks of the prior art and to provide an improved battery module cooling system.

Technical Solution

One or more of the drawbacks of the prior art are avoided or at least reduced by means of the present invention, particularly by the subject-matter of the appended independent claims.

A first aspect of the present invention relates to a coolant distributor for a battery module, the coolant distributor comprising a hollow profile that extends lengthwise in a first direction. The hollow profile comprises at least one exterior wall enclosing a coolant channel that is fluidly connecting a coolant inlet and a coolant outlet along the first direction. The hollow profile may have various cross-sectional shapes, such as e.g. a circular or a rectangular cross-sectional shape. Preferably, the hollow profile is an extruded aluminum profile. Such lightweight extruded profiles can be manufactured easily and cost-effectively.

The coolant distributor further comprises a plurality of coolant junctions that extend through a first exterior wall portion of the at least one exterior wall in a second direction. Each coolant junction provides a fluid connection between the coolant channel and an external coolant port. In other words, a plurality of fluid links is formed through the first exterior wall portion to the coolant channel enclosed therein. These coolant junctions are preferably formed after the extrusion of the profile during the common post-treatment of extruded aluminum profiles, e.g. by milling or drilling.

According to the present invention, each of the coolant ports comprises a port opening in the first exterior wall portion and a flange portion surrounding the port opening. In other words, the plurality of fluid links are formed through the first exterior wall portion such that a plurality of distinct openings is formed in the first exterior wall portion. Further, the port openings of the plurality of coolant junctions are aligned in the first direction. In other words, the port openings are arranged on a linear path connecting the coolant inlet and the coolant outlet. Preferably, all of the port openings and all of the coolant junctions are identical and equidistant. Also preferred, spacing and dimensions of the coolant ports are adapted to the spacing and dimensions of coolant ducts embedded in a bottom plate of a battery module.

According to the present invention, the second direction encloses an angle between 30° and 110° with the first direction. That is, when an imaginary line lying along the first direction is L1, an imaginary line lying along the second direction and passing L1 is L2, and an angle between L1 and L2 is α, α may be 30° to 110°. L1 may be disposed along a central axis of the hollow profile, L2 may be disposed along a central axis of the coolant junction, and α may be 90°. Further preferred, the coolant distributors are configured to be set up with a cooling system such that a coolant flows from the coolant inlet to the coolant outlet of the coolant distributor. Then, the coolant can easily flow from the coolant channel of the coolant distributor into the coolant junctions with reduced flow resistance.

The coolant distributor of the present invention provides a cost-effective and easy solution for distributing a coolant of a battery system's cooling system to the coolant ducts embedded in the bottom plate of a battery module housing. The processes required for producing the coolant distributor are commonly used in the manufacture of battery system housing components. Further, the coolant distributor of the invention is weldable to a bottom plate of a battery system housing with embedded coolant ducts and thus a highly resilient and tight connection can be provided between the coolant distributor and such bottom plate. Further, the coolant distributor of the present invention is fully monolithic and thus completely tight.

According to a particularly preferred embodiment, the coolant channel is a tubular profile, i.e. the coolant channel has an at least essentially circular cross section. Such extruded hollow profiles advantageously provide a highly uniform flow distribution of a coolant flowing therein and have maximum stability and durability. Further, the plurality of port openings are disposed in a first plane exterior surface of the first exterior wall portion of the extruded profile. For providing such plane exterior surface, the extruded profile deviates from the tubular form and comprises a bulged first exterior wall portion that is formed monolithically with the tubular profile of the coolant channel. Preferably the bulged first exterior wall portion has an essentially rectangular cross section and is continuous with the tubular profile.

Preferably, the tubular profile of the coolant channel and the at least one bulged first exterior wall portion are coextruded in the first direction. According to this embodiment, the plane exterior surface provides an advantageous connection face of the coolant distributor, e.g. to the lateral wall of a battery module housing's bottom plate, while allowing the use of a tubular profile. In this embodiment the flange portions are sections of the plane first exterior surface.

Further preferred, the coolant channel is a tubular profile and comprises a second exterior wall portion with a second plane exterior surface that is oriented parallel or perpendicular to the first plane exterior surface. For providing such a second plane exterior surface, the extruded profile comprises at least two, i.e. a first and a second, bulged portions of the exterior wall that are formed monolithically with the tubular profile of the coolant channel. Preferably also the second bulged portion has an essentially rectangular cross section and is continuous with the tubular profile.

For providing a second plane exterior surface that is oriented parallel to the first plane exterior surface the bulged second exterior wall portion is preferably disposed opposite to the bulged first exterior wall portion with respect to a central axis of the coolant channel. For providing a second plane exterior surface that is oriented perpendicular to the first plane exterior surface, the second exterior wall portion is preferably displaced from a central axis of the coolant channel in a direction perpendicular to the first direction and to the second direction. Preferably, the tubular profile of the coolant channel and the first and the second bulged portion are coextruded. The second plane exterior surface advantageously provides a supportive structure and/or a supportive foot for the coolant distributor and a battery module housing.

Bulged portions as described above can be omitted if an extruded profile with a rectangular cross-section is used for the coolant distributor. Therein, the first exterior wall portion for forming the plurality of coolant junctions is a first one of the four exterior walls of the rectangular cross-section that preferably has a larger wall thickness than the other exterior walls. Further, a second exterior wall portion with a second plane exterior surface that is oriented parallel or perpendicular to the first plane exterior surface preferably is a second exterior wall that is opposite or perpendicular to the first exterior wall and also has an increased wall thickness.

Summarized, a cross-sectional thickness of the first exterior wall portion exceeds the thickness of a residual of the at least one exterior wall. Exemplarily, a continuous bulged portion increases the cross-sectional thickness of the extruded profile in the region of the first exterior wall portion. Hence, stability of the coolant distributor is ensured even after forming the coolant junctions. Further preferred, a cross-sectional thickness of the first and second exterior wall portions exceed the thickness of a residual of the at least one exterior wall. Exemplarily, also the second continuous bulged portion increases the cross-sectional thickness of the extruded profile in the region of the second exterior wall portion.

Further preferred, the coolant distributor comprises an inlet connecting portion extending from the coolant inlet in the first direction along a section of the coolant channel and having a reduced exterior wall thickness. The coolant distributor further preferred comprises an outlet connecting portion extending from the coolant outlet opposite to the first direction along a section of the coolant channel and having a reduced exterior wall thickness. The inlet and outlet connecting portion are each configured for receiving a pipe coupling or any coupling element that is configured to be slideably inserted into the coolant channel of the coolant distributor. A step between the inlet/outlet connecting portion and the remaining coolant channel functions as a limiting stop for the insertion of a pipe coupling or coupling element.

Another aspect of the present invention relates to a method for manufacturing a coolant distributor for a battery module, particularly a coolant distributor as described above. This method comprises the steps of extruding an aluminum profile that extends lengthwise in a first direction and that comprises at least one exterior wall which encloses a coolant channel. Therein, the coolant channel fluidly connects a coolant inlet and a coolant outlet along the first direction. After extruding the aluminum profile, a plurality of coolant junctions is formed by milling and/or drilling through a first portion of the at least one exterior wall for providing a fluid connection between the coolant channel and a coolant port. Therein, the milling and/or drilling is performed such that the port openings of the plurality of coolant junctions are aligned in the first direction, i.e. arranged along a linear path between the coolant inlet and coolant outlet. Further, the milling and/or drilling is performed such that the coolant junctions extend in a second direction that encloses an angle between 30° and 110° with the first direction. That is, when an imaginary line lying along the first direction is L1, an imaginary line lying along the second direction and passing L1 is L2, and an angle between L1 and L2 is α, α may be 30° to 110°. L1 may be disposed along a central axis of the hollow profile, L2 may be disposed along a central axis of the coolant junction, and α may be 90°. As a result each of the coolant ports comprises a port opening in the first exterior wall portion. The milling and/or drilling is further performed such that the port openings are separated and distinct from each other such that a flange portion is surrounding each of the port openings.

In a preferred embodiment, the method further comprises the step of honing at least a portion of the coolant inlet and/or the coolant outlet for forming at least one of an inlet connecting portion and an outlet connecting portion with decreased exterior wall thickness. Particularly preferred in this embodiment, an aluminum profile is extruded that enclosed a coolant channel with at least essentially circular cross section. Thus, cylindrical honing is performed. The connecting portions are preferably configured for receiving a coupling element for connection two coolant distributors of the invention, wherein the coupling element is configured to be slideably inserted into the coolant channels of the coolant distributors. Further, the step between the inlet/outlet connecting portion and remaining coolant channel functions as a limiting stop for the insertion of a pipe coupling or similar coupling element.

A second aspect of the present invention relates to a battery module housing comprising a bottom plate with a top surface that is configured for supporting a plurality of battery cells. A plurality of coolant ducts are embedded in the bottom plate and extend through the bottom plate in a lengthwise direction of the bottom plate. Therein, each coolant duct fluidly connects an inlet opening in a first lateral wall of the bottom plate with an outlet opening in a second lateral wall of the bottom plate. The second lateral wall is preferably opposite and plane parallel to the first lateral wall. The battery module housing preferably comprises lateral side walls that extend from the bottom pate and might be continuous with a third lateral wall and a fourth lateral wall of the bottom plate that are perpendicular to the first and second lateral wall, respectively. The battery module housing then essentially has a U-shape. Preferably, the bottom plate and the side walls are commonly extruded and form a monolithic part.

In the battery module housing of the present invention, a coolant distributor according to the invention and as described above is welded, preferably laser welded, to the first lateral wall of the bottom plate. Therein, the first exterior wall portion of the coolant distributor, preferably a first plane exterior surface thereof, sits tightly on the first lateral wall of the bottom plate. In other words, the first lateral wall of the bottom plate and the exterior surface of the first exterior wall portion of the coolant distributor are complementary, preferably parallel and immediately adjacent to each other. A welding seam extends along a common edge portion of the adjacent first lateral wall and of the exterior surface of the first exterior wall portion. According to the invention, each of the plurality of port openings of the coolant distributor is aligned with one of the plurality of inlet openings of the bottom plate and further the plurality of coolant ducts are sealed against each other by the flange portions there between.

The battery module housing of the present invention advantageously comprises a coolant distributor as an integral part and can be thus connected to a cooling system of a battery system right away and without no or reduced need for further components Therein, the weld connection between the coolant distributor and the bottom plate advantageously provides a completely fluid-tight connection. Further, as both the bottom plate (e.g. with continuous side walls) and the coolant distributor are extruded profiles, they can be both produced by the same manufacturer and/or in the same facility. Further, the only additional process is a welding process and hence the required process technology is rather simple.

Preferably another coolant distributor (second coolant distributor) according to the present invention as described above, is welded to the second lateral wall of the bottom plate. Therein, the first exterior wall portion of the other coolant distributor, preferably a first plane exterior surface thereof, sits tightly on the second lateral wall of the bottom plate. In other words, the second lateral wall of the bottom plate and the exterior surface of the first exterior wall portion of the other coolant distributor are complementary, preferably parallel and immediately adjacent to each other. A welding seam extends along a common edge portion of the adjacent second lateral wall and of the exterior surface of the first exterior wall portion of the other coolant distributor.

According to the invention, each of the plurality of port openings of the other coolant distributor is aligned with one of the plurality of outlet openings of the bottom plate and further the plurality of coolant ducts are sealed against each other by the flange portions of the other coolant distributor that are disposed there between. This embodiment advantageously allows for connecting the embedded cooling ducts of a single battery module housing to a coolant circuit of a cooling system using solely two coolant distributors according to the invention, wherein these coolant distributors are tightly connected to the bottom plate by weld connections. For connecting a single battery module housing to a coolant circuit preferably the coolant outlet of the first coolant distributor and the coolant inlet of the second coolant distributor are sealed in order to provide a closed coolant circuit through the battery module housing.

According to a preferred embodiment of the battery module housing, the bottom plate, e.g. with continuous side walls, is an extruded aluminum profile and also the coolant distributor is an extruded aluminum profile. Hence, the same material properties, particularly the same thermal expansion properties, are guaranteed for the bottom plate and the coolant distributor. Hence, stress and tension in the weld connection is minimized over a wide temperature range and fluid tightness between the coolant distributor and the bottom plate is reliably ensured.

In a further preferred embodiment of the battery module housing the second direction is perpendicular to the first direction and/or the embedded coolant ducts extend in the second direction. In other words, the embedded coolant ducts prolong the coolant junctions of the coolant distributor and vice versa. Hence, coolant flow is undisturbed in transitioning from the distributor to the bottom plate or the other way round and flow resistance is minimized. Also by providing the first direction perpendicular to the second direction, the length of the coolant junctions is minimized and hence a production process of the coolant distributor is simplified.

Another aspect of the present invention relates to a method for manufacturing a battery module, particularly a battery module according to the present invention, as described above. The method of the invention comprises the step of extruding an aluminum bottom plate with a top surface that is configured for supporting a plurality of battery cells and with a plurality of coolant ducts embedded in the bottom plate. The plurality of coolant ducts extends through the bottom plate in a lengthwise direction of the bottom plate. Therein, each coolant duct fluidly connects an inlet opening in a first lateral wall of the bottom plate with an outlet opening in a second lateral wall of the bottom plate. Therein, the second lateral wall is plane parallel and opposite to the first lateral wall.

In a preferred embodiment, lateral sidewalls are formed continuous with the bottom plate, wherein the lateral side walls extend from the bottom pate in a common direction, wherein a first sidewall might be continuous with a third lateral wall and a second side wall might be continuous with a fourth lateral wall of the bottom plate. Therein, the third and fourth lateral walls are perpendicular to the first and second lateral wall, respectively. The battery module housing then essentially has a U-shape. Preferably, the bottom plate and the side walls are commonly extruded and form a monolithic part.

In the next step of the method of the invention, a coolant distributor according to the present invention and as described above is provided and welded, preferably laser welded, to the first lateral wall of the bottom plate, such that the first exterior wall portion sits tightly on the first lateral wall. Before welding, the coolant distributor and the bottom plate are aligned such that each of the plurality of port openings is aligned with one of the plurality of inlet openings. After welding, the coolant ducts are sealed against each other by the flange portions therebetween.

This method of manufacturing a battery module housing advantageously provides a battery module housing that can be integrated in a coolant circuit of a cooling system of the battery module right away as it comprises a monolithically and fluid-tightly integrated coolant distributor for distributing the coolant of the coolant circuit to each of the embedded cooling ducts of the bottom plate via a single coolant inlet. Further, the method of the invention can be advantageously performed by the manufacturer of the extruded profiles as well as by the manufacturer of a battery system.

A third aspect of the present invention relates to a pipe coupling for interconnecting a first coolant distributor of a first battery module housing with a second coolant distributor of a second battery module housing. The pipe coupling of the invention comprises a molded, preferably injection molded, hollow profile, which is configured to form a joint coolant channel with the first coolant distributor and the second coolant distributor. In other words, the hydrodynamic diameters of the first coolant distributor, the second coolant distributor and the pipe coupling are connected and allow for forming a channel for a coolant to circulate.

The pipe coupling of the invention further comprises a first bulged portion that is disposed at a first terminal end of the molded hollow profile. Preferably the first bulged portion is monolithic with the molded hollow profile and particularly preferred both are injection molded as a single part. The cross-sectional form of the first bulged portion corresponds to the cross-sectional form of the extruded hollow profile of the first coolant distributor, particularly to the cross-sectional form of the coolant channel of the first coolant distributor. Particularly preferred, the cross-sectional form of the first bulged portion corresponds to the cross-sectional shape and the axial length of an outlet connecting portion of the first coolant distributor. A first circumferential gasket extends continuously along a perimeter of a cross-section of the first bulged portion. The first bulged portion is configured for being press-fitted into the coolant outlet, preferably the outlet connecting portion, of the first coolant distributor. The first circumferential gasket provides sealing between an outer surface of the first bulged portion and an inner surface of the coolant outlet, preferably of the outlet connecting portion, of the first coolant distributor. The bulged portion may comprise a depression for the gasket.

The pipe coupling of the invention further comprises a second bulged portion that is disposed at a second terminal end of the molded hollow profile, opposite to the first terminal end. Preferably the second bulged portion is monolithic with the molded hollow profile and particularly preferred both are injection molded as a single part. The cross-sectional form of the second bulged portion corresponds to the cross-sectional form of the extruded hollow profile of the second coolant distributor, particularly to the cross-sectional form of the coolant channel of the second coolant distributor. Particularly preferred, the cross-sectional form of the second bulged portion corresponds to the cross-sectional shape and the axial length of an inlet connecting portion of the second coolant distributor. A second circumferential gasket extends continuously along a perimeter of a cross-section of the second bulged portion. The second bulged portion is configured for being press-fitted into the coolant inlet, preferably the inlet connecting portion, of the second coolant distributor. Therein, the second circumferential gasket provides sealing between an outer surface of the second bulged portion and an inner surface of the coolant inlet, preferably of the inlet connecting portion, of the second coolant distributor. The bulged portion may comprise a depression for the circumferential gasket.

The pipe coupling further comprises at least one torsion protection element that is protruding from an exterior surface of the molded hollow profile. The torsion protection element is configured for contacting the bottom plate of at least one of the first and second battery module housing in at least one rotational state of the pipe coupling and to prevent any further rotation of the pipe coupling above that rotational state thereof. In other words, the torsion protection element is configured to function as a rotational limit-stop of the pipe coupling in conjunction with the bottom plate of at least battery module housing thus securing the pipe coupling against rotation.

In a preferred embodiment of the pipe coupling the torsion protection element comprises at least one cover element. Preferably, the cover element is disposed at a terminal tip of the torsion protection element and spaced away from the exterior surface of the molded hollow profile. The at least one cover element is configured for fittingly receiving at least one screw head that is protruding from the lower surface of the bottom plate of at least one of the first and second battery module housing, wherein the lower surface is opposite to the top surface of this bottom plate. Further, in at least one rotational state of the pipe coupling the cover element fittingly receives the screw head protruding from the lower surface of a bottom plate. The cover element is then configured also as an axial limit-stop in conjunction with the screw.

Particularly preferred, the torsion protection element comprises a first cover element that is configured for fittingly receiving a first screw head protruding from the lower surface of the bottom plate of a first battery module housing and a second cover element that is configured for fittingly receiving a second screw head protruding from the lower surface of the bottom plate of a second battery module housing. Advantageously in this embodiment, the pipe coupling is axially secured in a very reliable manner.

A fourth aspect of the present invention relates to a battery system housing comprising a plurality of battery module housings according to the present invention. Therein, each battery module housing is configured for comprising a battery module with a plurality of aligned battery cells that are disposed on a bottom plate of the respective battery module housing. Each battery module housing thus comprises at least one coolant distributor according to the invention that is welded to a bottom plate with embedded coolant ducts such that the coolant ports of the coolant distributor are aligned with the inlet/outlet openings of the coolant ducts.

The battery system housing further comprises a plurality of pipe couplings according to the present invention as described above, each pipe coupling interconnecting a first coolant distributor of a battery module housing with a second coolant distributor of an adjacent battery module housing. Preferably, the battery system housing comprises a plurality of second pipe couplings, each second pipe coupling interconnecting another coolant distributor of the battery module housing with another coolant distributor of the adjacent battery module housing. In one outermost battery module housing of such battery system housing the coolant outlet of the coolant distributor and the coolant inlet of the other coolant distributor are sealed for forming a closed coolant circuit with only one inlet and only one outlet.

In the battery system housing, each of the pipe couplings comprises a molded hollow profile that is configured to form a joint coolant channel with the first (other) coolant distributor and the second (other) coolant distributor. Each pipe coupling further comprises a first bulged portion at a first terminal end of the molded hollow profile. Therein, the first bulged portion has a cross-sectional form that corresponds to the cross-sectional form of the extruded hollow profile, preferably the coolant channel, particularly preferred the outlet connecting portion, of the first coolant distributor. Further, the first bulged portion has a first circumferential gasket and is configured for being press-fitted into the coolant outlet of the first coolant distributor. Each pipe coupling further comprises a second bulged portion at a second terminal end of the molded hollow profile. Therein, the second bulged portion has a cross-sectional form that corresponds to the cross-sectional form of the extruded hollow profile, preferably the coolant channel, particularly preferred the inlet connecting portion, of the second coolant distributor. Further, the second bulged portion has a second circumferential gasket and is configured for being press-fitted into the coolant inlet of the second coolant distributor. Each pipe coupling further comprises at least one torsion protection element that is protruding from an exterior surface of the molded hollow profile and that is configured for contacting the lower surface of the bottom plate of at least one of the first and second battery module housing in at least one rotational state of the pipe coupling.

The battery system of the present invention advantageously forms a full coolant circuit solely out of battery module housings according to the invention and pipe couplings of the invention. Therein, each of the battery module housings essentially consist of two extruded profiles welded together and each of the pipe couplings essentially consist of a injection molded tubing and two circumferential gaskets. Hence, a complete and reliably fluid-tight coolant circuit for heat exchange with a plurality of battery cells is formed of a minimum amount of components. The battery system housing is thus easy to manufacture and cost-effective.

In a preferred embodiment of the battery system of the invention, the torsion protection element of each pipe coupling comprises a first cover element that is configured for fittingly receiving a first screw head which is protruding from the lower surface of the bottom plate of a first battery module housing and further comprises a second cover element that is configured for fittingly receiving a second screw head which is protruding from the lower surface of the bottom plate of a second battery module housing. Preferably, a screw head is protruding from lower surface of the bottom plate of each of the battery module housings. Then, the cover elements in conjunction with the screw heads reliably fixate the pipe coupling in an axial (or lengthwise) direction of the pipe coupling.

According to another aspect of the present invention, a vehicle including a battery system housing as defined above is provided. Further aspects of the present invention could be learned from the dependent claims or the following description.

Advantageous Effects

According to the fluid connector of the present invention, it is possible to facilitate mounting the fluid connector to the battery pack.

DESCRIPTION OF DRAWINGS

Features will become apparent to those of ordinary skill in the art by describing in detail exemplary embodiments with reference to the attached drawings in which.

MODE OF INVENTION

Figure 1:
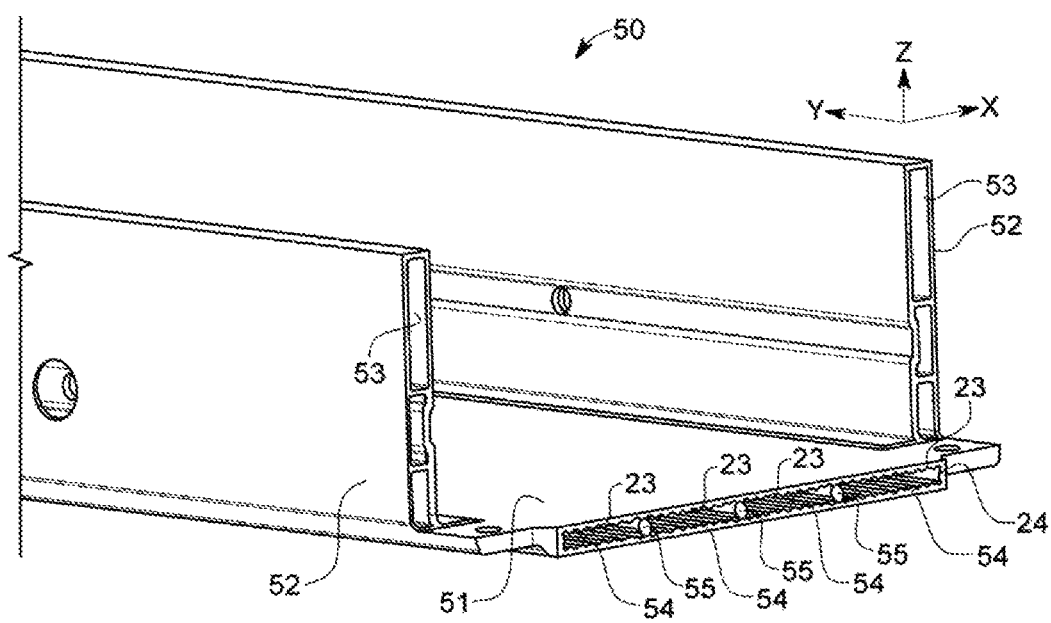
FIG. 1 illustrates a schematic perspective view of a battery module housing according to the prior art or part of a battery module housing according to an embodiment.

Reference will now be made in detail to embodiments, examples of which are illustrated in the accompanying drawings. Effects and features of the exemplary embodiments will be described with reference to the accompanying drawings. In the drawings, like reference numerals denote like elements, and redundant descriptions are omitted.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise. It will be understood that although the terms "first" and "second" are used to describe various elements, these elements should not be limited by these terms that only distinguish the elements. For example, a first element may be named a second element and, similarly, a second element may be named a first element, without departing from the scope of the present invention.

It will be further understood that the terms "include," "comprise," "including," or "comprising" specify a property, a region, a fixed number, an element, a component, and a combination thereof but do not exclude other properties, regions, fixed numbers, elements, components, and combinations thereof. It will be understood that when an element or layer is referred to as being "on," "connected to," or "coupled to" another element or layer, it can be directly on, connected to, or coupled to the other element or layer, or one or more intervening elements or layers may be present. It will be also understood that when an element or layer is referred to as being "between" two elements or layers, it can be the only element or layer between the two elements or layers, or one or more intervening elements or layers may also be present.

Herein, terms such as "substantially," "about," are used as terms of approximation and not as terms of degree, and are intended to account for the inherent deviations in measured or calculated values that would be recognized by those of ordinary skill in the art. If the term "substantially" is used in combination with a feature that could be expressed using a numeric value, the term "substantially" denotes a range of +/−5% of the value centered on the value.

Unless otherwise defined, all terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
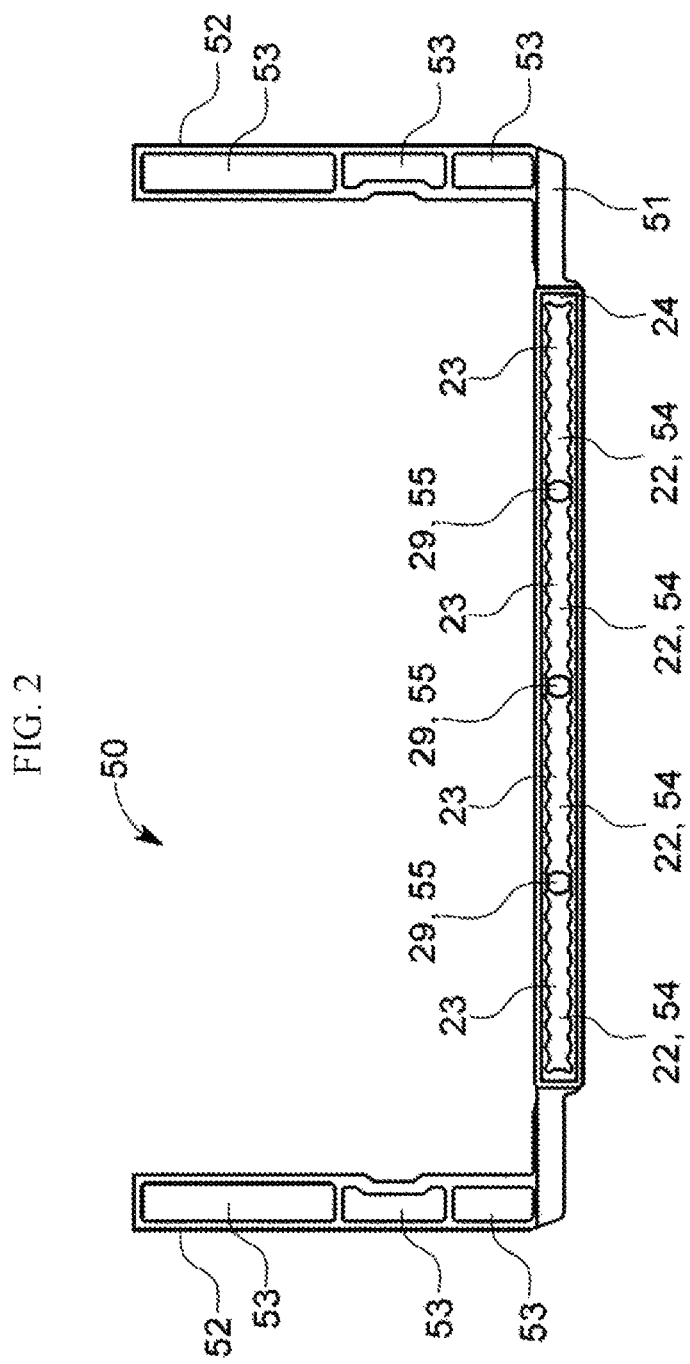
FIG. 2 illustrates a frontal cross section of the battery module housing of FIG. 1.

A battery module housing 50 according to the prior art is shown in a perspective view in FIG. 1 and in a cross-sectional view in FIG. 2. The battery module housing 50 is an extruded aluminum profile and comprises a bottom plate 51 and a pair of lateral side walls 52. The lateral side walls 52 comprise hollows 53 for weight reduction. A plurality of coolant ducts 54 is embedded in the bottom plate 51, wherein adjacent coolant ducts 54 are separated from each other by a plurality of duct separators 55. The coolant ducts 54 have corrugated surfaces in order to increase heat transport capability via these surfaces. The separators 55 are not aligned with the front facing lateral wall of the bottom plate 51 but are recessed with respect to this lateral wall and are slightly set back into the coolant ducts 54.

A plurality of aligned battery cells, e.g. a plurality of prismatic (or rectangular) battery cells, e.g. with the wide flat surfaces of the cells being stacked together for forming a battery module, can be disposed on the bottom plate 51 of the battery module housing 50. The invention is no limited thereto, and a plurality of battery cells may have a cylindrical shape. Then, the bottom plate 51 of the battery module housing 50 is provided adjacent to the bottom surfaces of the plurality of battery cells for cooling the battery cells and is thus configured as a cooling plate for the plurality of battery cells. The plurality of coolant ducts 54 usually extend in a stacking direction of the plurality of aligned battery cells disposed therein. The coolant ducts 54 can be connected to a cooling system of a battery system such that a coolant can flow there through and perform a heat exchange with the aligned plurality of battery cells.

Each battery cell may include a battery case configured for accommodation of an electrode assembly and an electrolyte. The battery case may be hermetically sealed by a cap assembly that is provided with positive and negative electrode terminal and having different polarities, and a vent. The vent may be a safety means of the battery cell, which acts as a passage through which gas generated in the battery cell can be exhausted to the outside of the battery cell. The positive and negative electrode terminals and of two or more cells can be electrically connected through at least one bus bar for electrically connecting the cells as one bundle.

Figure 3:
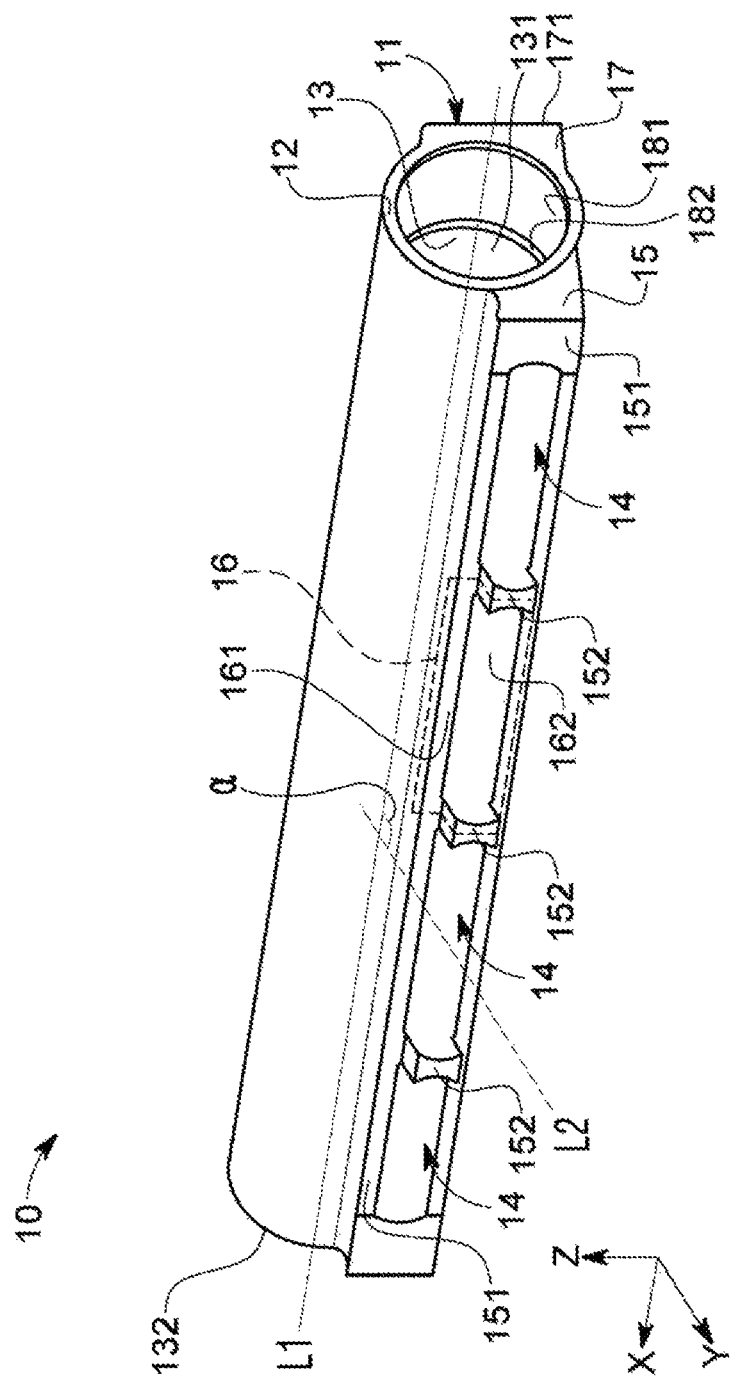
FIG. 3 illustrates a schematic perspective view of a coolant distributor according to an embodiment.

FIG. 3 shows a perspective view of a coolant distributor 10 according to an embodiment of the present invention. The coolant distributor 10 is an extruded aluminum profile 11 comprising an exterior wall 12 that encloses a coolant channel 13. The coolant channel 13 connects a coolant inlet 131 with a coolant outlet 132 along a first direction, i.e. the x-direction.

The coolant channel 13 has a tubular profile, i.e. an essentially circular cross section. However, the cross section of the extruded aluminum profile 11 deviates from the circular form. Particularly, it comprises a first exterior wall portion 15 that is formed as a bulged portion with essentially rectangular cross section that is continuous with the tubular profile of the coolant channel 13 and has been coextruded with the tubular profile of the coolant channel 13. The cross section of the extruded aluminum profile 11 further deviates from the circular from by comprising a second exterior wall portion 17 that is also formed as a bulged portion with essentially rectangular cross section that is continuous with the tubular profile of the coolant channel 13 and has been coextruded with the tubular profile. The second exterior wall portion 17 is opposite to the first exterior wall portion 15 with respect to a central axis of the coolant channel 13 extending along the coolant channel 13, i.e. along the x-axis. The first exterior wall portion 15 provides a plane first exterior surface 151 facing outward and the second exterior wall portion 17 provides a plane second exterior surface 171 that is plane parallel to the plane first exterior surface 151 but faces in the opposite direction.

A plurality of coolant junctions 14 is drilled and/or milled through the first exterior wall portion 15 in a second direction, i.e. the Y-direction, for fluidly connecting an exterior of the coolant distributor 10 with coolant channel 13. By forming the coolant junctions 14 a plurality of coolant ports 16 are formed on the plane first exterior surface 151, wherein each coolant port 16 comprises a port opening 162 and a flange portion 161 fully surrounding the port opening 162. In other words, each fluid junction 14 provides an additional channel connecting the coolant channel 13 with the corresponding coolant port opening 162.

In the embodiment illustrated in FIG. 3, each of the port openings 162 as well as each of the coolant junctions 14 has a rectangular cross section; however other cross-sectional shapes are possible. The cross-sectional shape and the dimensions of the coolant junctions 14 and hence of the coolant ports 16 are adapted to the cross-sectional shape and the dimensions of the coolant ducts of a battery module housing as explained below. The coolant ports 16 are further aligned along the first direction (X-direction), i.e. they are arranged on a linear path from the coolant inlet 131 to the coolant outlet 132. The flange portion 161 of each coolant port 16 is separating the port opening 162 of a first coolant junction 14 from the port opening 162 of at least one adjacent coolant junction 14. Particularly, a junction separator 152 is formed between adjacent port openings 162, wherein the junction separators 152 protrude from the plane first exterior surface 151 in the second direction (Y-direction). These junction separators 152 are thus extensions of the walls separating adjacent coolant junctions 14.

Also, when an imaginary line lying along the first direction (X) is L1, an imaginary line lying along the second direction (Y) and passing L1 is L2, and an angle between L1 and L2 is α, α satisfies a scope of 30° to 110°. α may satisfy a scope of 30° to 90° such that a flow of the coolant from the hollow profile 11 to the coolant junction 14 can be easily performed. In the embodiment illustrated in FIG. 3, L1 may be disposed along a central axis of the hollow profile 11, L2 may disposed along a central axis of the coolant junction 14, and α may be 90°.

The coolant distributor 10 of FIG. 3 further comprises an inlet connecting portion 181 formed at the coolant inlet 131 of the coolant distributor 10. The inlet connecting portion 181 is formed by honing a part of the coolant channel 13 extending from the profile's 11 terminal end at the coolant inlet 131 along the first direction (X-direction). Hence, the inlet connecting portion 181 is a section of the coolant channel 13, where the exterior wall 11 has a decreased wall thickness. Thus, a step 182 results between the inlet connecting portion 181 and a residual coolant channel 13. The coolant distributor 10 further comprises an outlet connecting portion formed at the coolant outlet 132 of the coolant distributor 10. The outlet connecting portion is formed by honing a part of the coolant channel 13 extending from the profile's terminal end at the coolant outlet 132 against the first direction (X-direction). The outlet connecting portion is a section of the coolant channel 13, where the exterior wall 11 has a decreased wall thickness.

Figure 4:
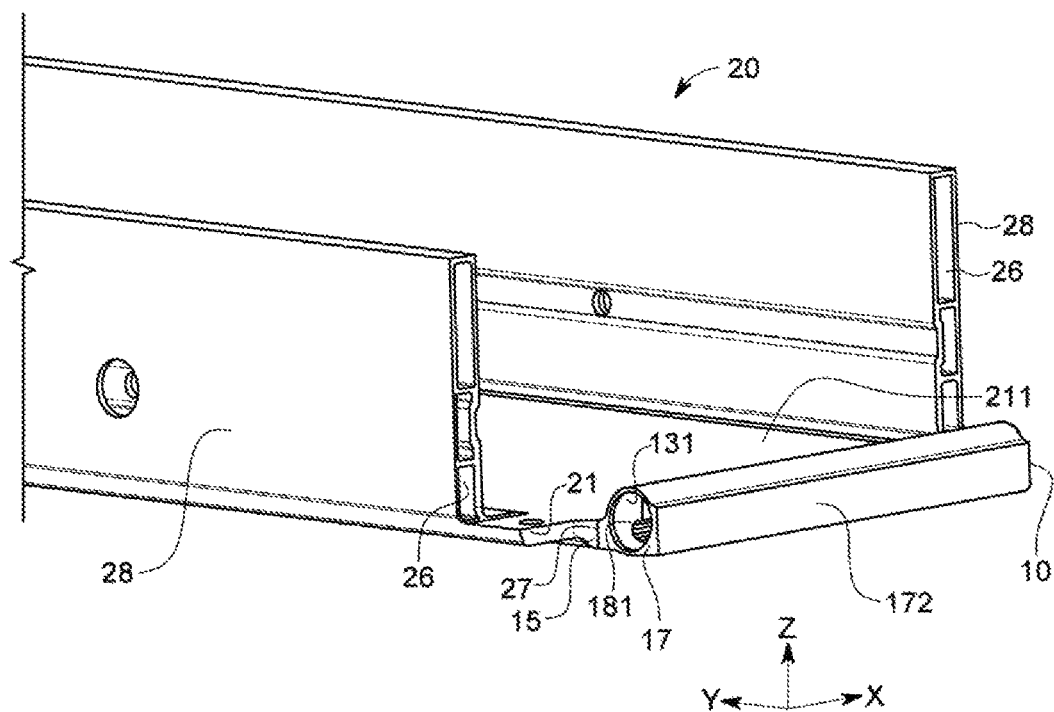
FIG. 4 illustrates a schematic perspective view of a battery module housing according to an embodiment.

FIG. 4 illustrates a schematic perspective view of a battery module housing 20 according to an embodiment. The battery module housing 20 comprises a bottom plate 21 with a top surface 211 that is configured for supporting a plurality of battery cells (not shown). Two side walls 28 extend upwards from lateral walls of the bottom plate 21 and are continuous with the bottom plate 21. Particularly, the bottom plate 21 and the side walls 28 are commonly formed by extruding a U-shaped aluminum profile. Hollows 26 are disposed in the side walls 28 for providing a lightweight battery module housing 20. Further features of the battery module housing 20 are explained with respect to FIGS. 1 and 2 as the extruded U-shaped aluminum profile of FIGS. 4, 5 is identical to that of the battery module housing 50 of FIGS. 1, 2.

The battery module housing 20 according to an embodiment comprises a plurality of coolant ducts 22 that are identical to the coolant ducts 54 of the battery module housing of FIGS. 1, 2. The coolant ducts 22 of the battery module 20 are separated by duct separators 29 that are similar to the duct separators 55 of the battery module housing of FIGS. 1, 2. Each of the embedded coolant ducts 22 fluidly connects an inlet opening 23 in a first lateral wall 24 of the bottom plate 21 with an outlet opening (not shown) in a second lateral wall (not shown) opposite the first lateral wall 24.

As further shown in FIG. 4, the battery module housing 20 further comprises a coolant distributor 10 as illustrated in FIG. 3. The coolant distributor 10 is welded to the bottom plate 21 such that the first lateral wall 24 of the bottom plate 21 and the plane first exterior surface 151 of the coolant distributor 10 (see FIG. 3) face each other and are immediately adjacent to each other. A weld seam 27 is formed along a common peripheral region of the first lateral wall 24 of the bottom plate 21 and the plane first exterior surface 151 of the coolant distributor 10. In the welded state as illustrated in FIG. 4, each coolant port 16 of the coolant conductor 10 is aligned with an embedded coolant duct 22 of the bottom plate 21, wherein the port openings 162 are aligned with the inlet openings 23 and the flange portions 161 are aligned with the separators 29 limiting the respective inlet opening 23. Hence, a continuous fluid connection is formed between the coolant inlet 131 of the coolant conductor 10 and each of the embedded coolant ducts 22 of the bottom plate 21 via the respective coolant junction 14.

Figure 5:
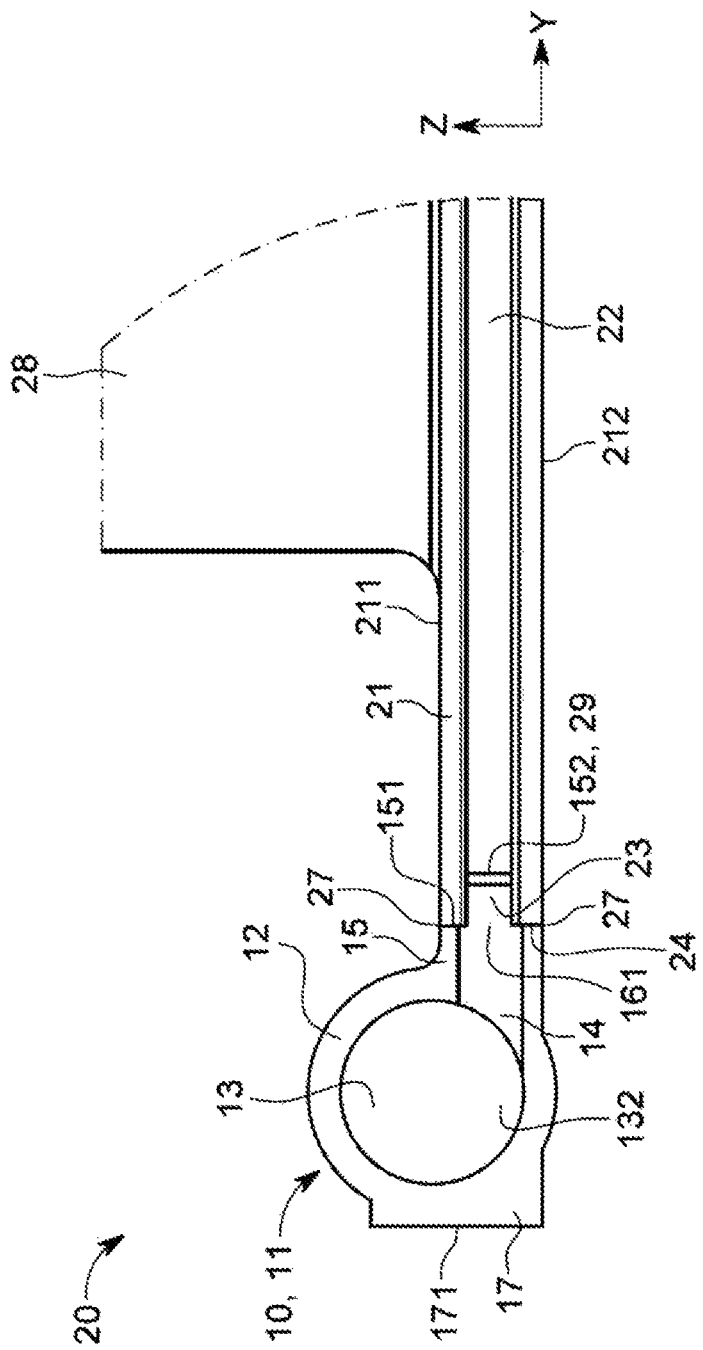
FIG. 5 illustrates a cross section of the battery module housing of FIG. 4 along the second direction.

FIG. 5 illustrates a cross section of the battery module housing of FIG. 4 along the second direction (Y-direction). The cross section shows the fluid connection between a coolant junction 14 formed in the first exterior wall portion 15 and a coolant duct 22 embedded in the bottom plate 21. The cross section further shows how the tubular profile 11 of the coolant channel 13 is continuous with the first exterior wall portion 15 and the second exterior wall portion 17. The cross section of FIG. 5 further shows that the recessed duct separators 29 between the coolant ducts 22 of the bottom plate 21 are slightly set back with respect to the first lateral wall 24 of the bottom plate 21 and are complementary to the junction separators 152 protruding from the plane first exterior surface 151 of the coolant distributor 10. Particularly, a contact surface between the duct separators 29 of and the junction separators 152 is shifted along the second direction (Y-direction) with respect to the weld connection 27 between the first lateral wall 24 and the plane first exterior surface 151.

Figure 6:
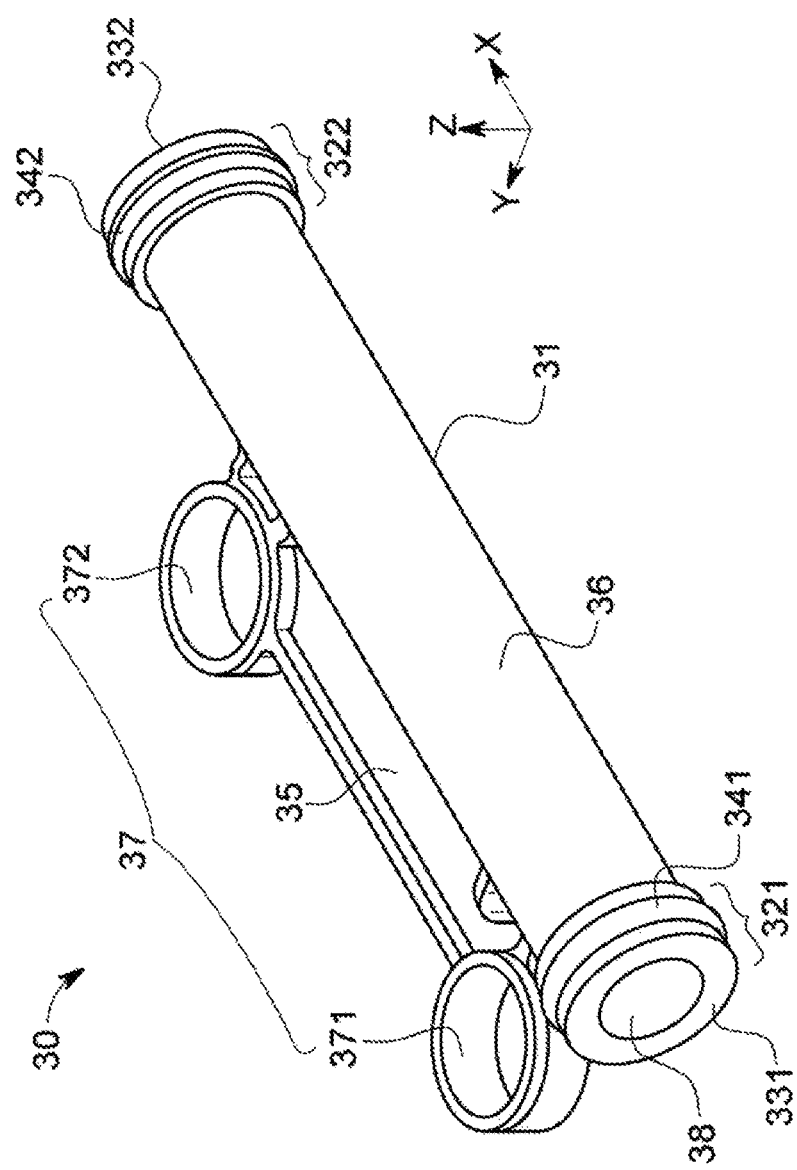
FIG. 6 illustrates a schematic perspective view of a pipe coupling according to an embodiment.
Figure 7:
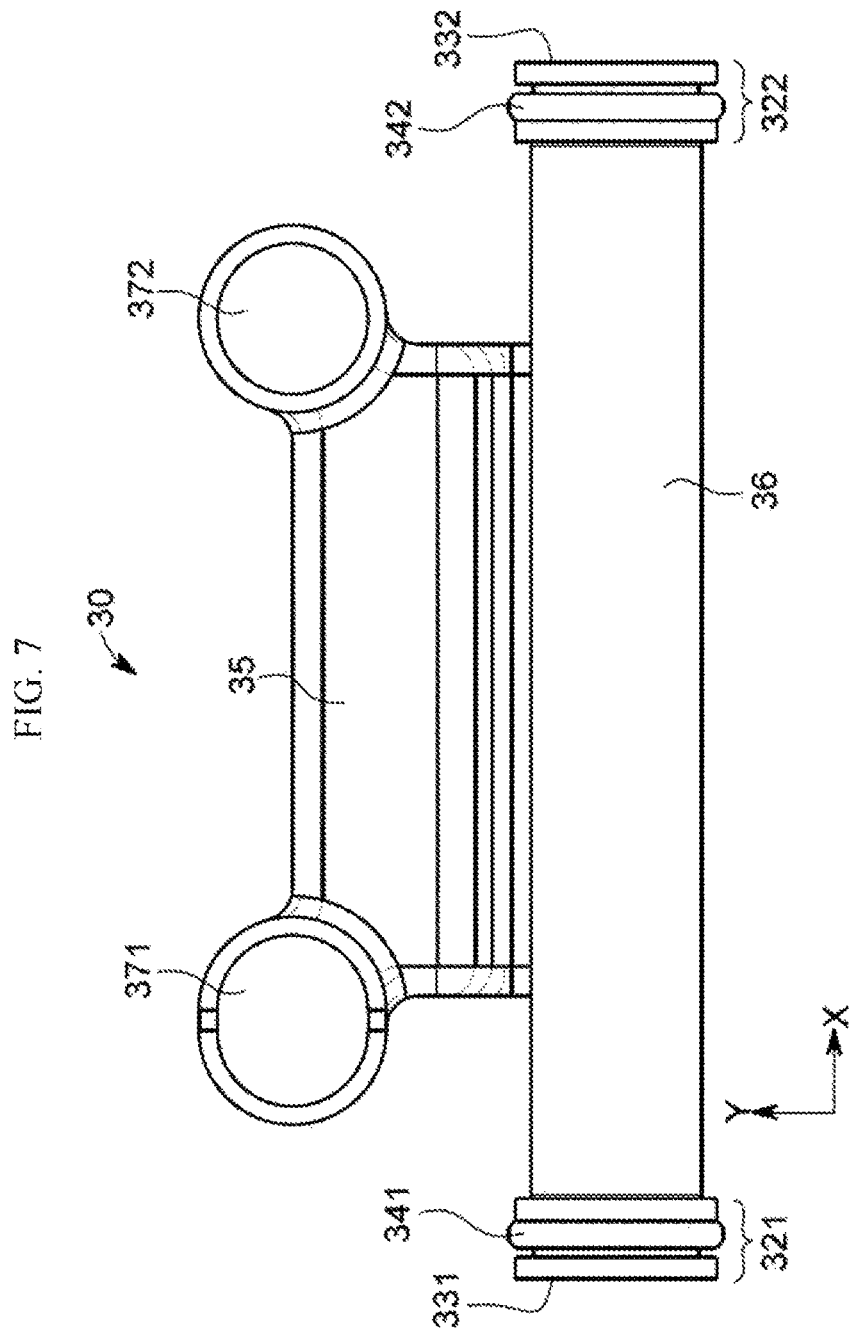
FIG. 7 illustrates a schematic top view of a pipe coupling according to an embodiment.
Figure 8:
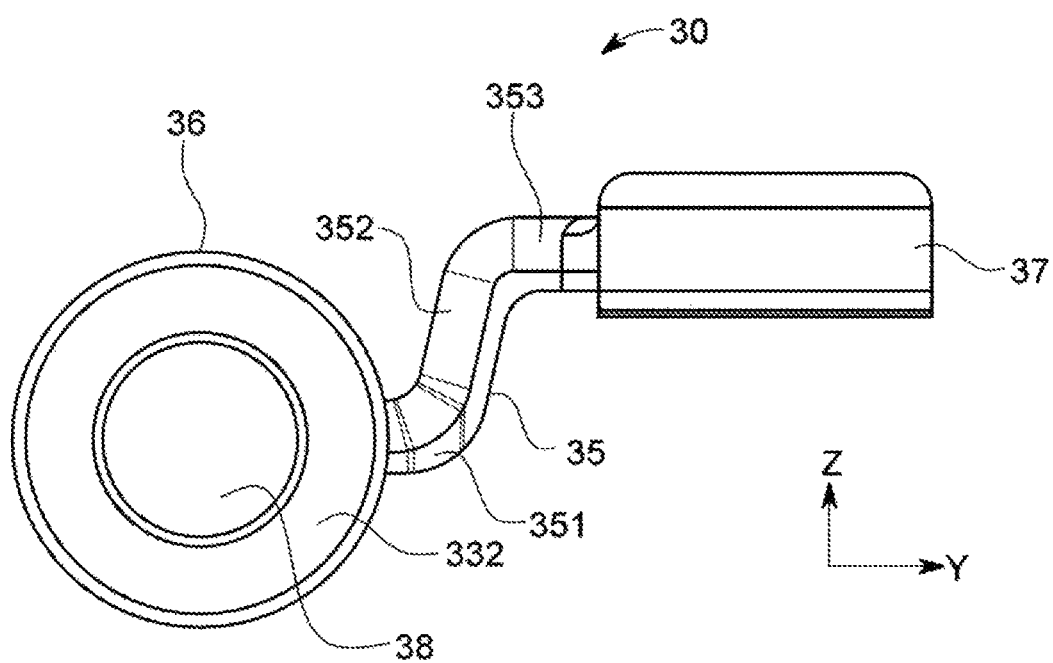
FIG. 8 illustrates a schematic side view of a pipe coupling according to an embodiment.

FIGS. 6 to 8 illustrate different views of a pipe coupling 30 according to an embodiment. The pipe coupling 30 comprises a molded hollow profile 31 that encloses a connection channel 38. The connection channel 38 is configured to form a joint coolant channel with the coolant channels 13 of a two coolant distributors 10 according to the invention. The molded hollow profile 31 is injection molded from a plastic resin and comprises a first bulged portion 321 at a first terminal end 331 and a second bulged portion 322 at a second terminal end 332. Therein, the first bulged portion 321 and the second bulged portion 322 have a larger circumference than the residual molded hollow profile 31, while a diameter of the connection channel 38 might be constant over the whole length of the molded hollow profile 31.

A first circumferential gasket 341 is arranged in the first bulged portion 321 and circumferentially encircles the molded hollow profile 31 in the first bulged portion 321. The first bulged portion 321 may comprise a depression, e.g. with a circumference that is equal to that of the residual hollow molded profile 31, and the first circumferential gasket 341 may be arranged in this depression. The first bulged portion 321 is configured to be slideably inserted into a coolant channel 13 of a coolant distributor 10.

A second circumferential gasket 342 is arranged in the second bulged portion 322 and circumferentially encircles the molded hollow profile 31 in the second bulged portion 322. The second bulged portion 322 may comprise a depression, e.g. with a circumference that is equal to that of the residual hollow molded profile 31, and the second circumferential gasket 342 may be arranged in this depression. The second bulged portion 322 is configured to be slideably inserted into a coolant channel 13 of a coolant distributor 10.

The pipe coupling 30 further comprises a torsion protection element 35 that protrudes from an exterior surface 36 of the molded hollow profile 31. According to the illustrated embodiment, the torsion protection element 35 is a flat and two-dimensional element that is coextruded with the molded hollow profile 31 and protrudes from a central part of the exterior surface 36 of the hollow profile 31, i.e. the between the bulged portions 321, 322. An intersecting line between the torsion protection element 35 and the exterior surface extends in the first direction (X-direction).

The illustrated torsion protection element 35 protrudes essentially perpendicular from the exterior surface 36, then bends for a first time about 90° in a first direction and then bends for a second time about 90° in a second direction, different from the first direction. Hence, a first portion 351 of the illustrated torsion protection element 35 is almost perpendicular to the exterior surface 36, a second portion 352 extends almost perpendicular to the first portion 351 and a third portion 353 of the torsion protection element 35 extends almost perpendicular to the second portion 352 and almost parallel to the first portion 351. The cross-sectional shape of the torsion protection element 35 is thus S-shaped as illustrated in FIG. 8.

The torsion protection element 35 is configured to engage with a lower surface 212 (see FIG. 9) of the bottom plate 21 of a battery module housing 20 of an embodiment in at least one rotational state of the pipe coupling 30, when the pipe coupling 30 is inserted into the coolant channel 13 of at least one coolant distributor 10 of the invention. In other words, the torsion protection element 35 is configured as a lever with sufficient length and stiffness for blocking any rotational movement of the pipe coupling 31 once the torsion protection element 35 engages with any surface.

The illustrated torsion protection element 35 further comprises at least one cover element 37. In the embodiment, the torsion protection element 35 comprises a first cover element 371 that is disposed at a first of two corners of an outermost edge of the flat and two-dimensional torsion protection element 35 and comprises a second cover element 372 that is disposed at a second of the two corners of the outermost edge of the torsion protection element 35. Each of the cover elements 371, 372 is continuous with the residual torsion protection element 35 and essentially cup-shaped. Therein, the diameter and depth of the cup-shaped cover elements 371, 372 are adapted to the diameter and the height of screw heads protruding from a lower surface of a bottom plate of a battery module housing to which the pipe coupling 30 shall be attached. The cover elements 371, 372 are configured to fittingly receive a respective one of these screw heads in at least one rotational state of the pipe coupling 30.

Figure 9:
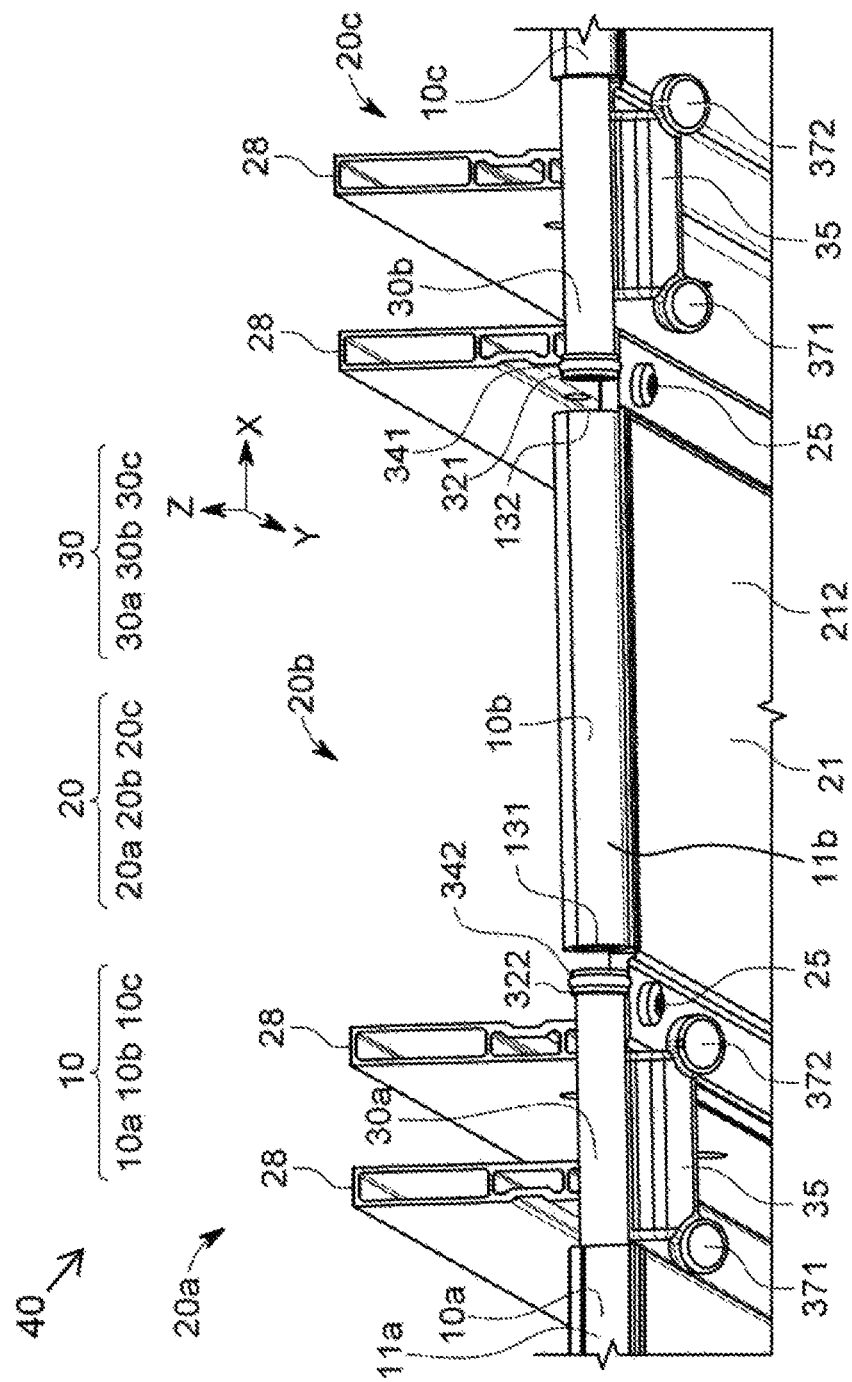
FIG. 9 illustrates a schematic perspective view of a battery system housing according to an embodiment.
Figure 10:
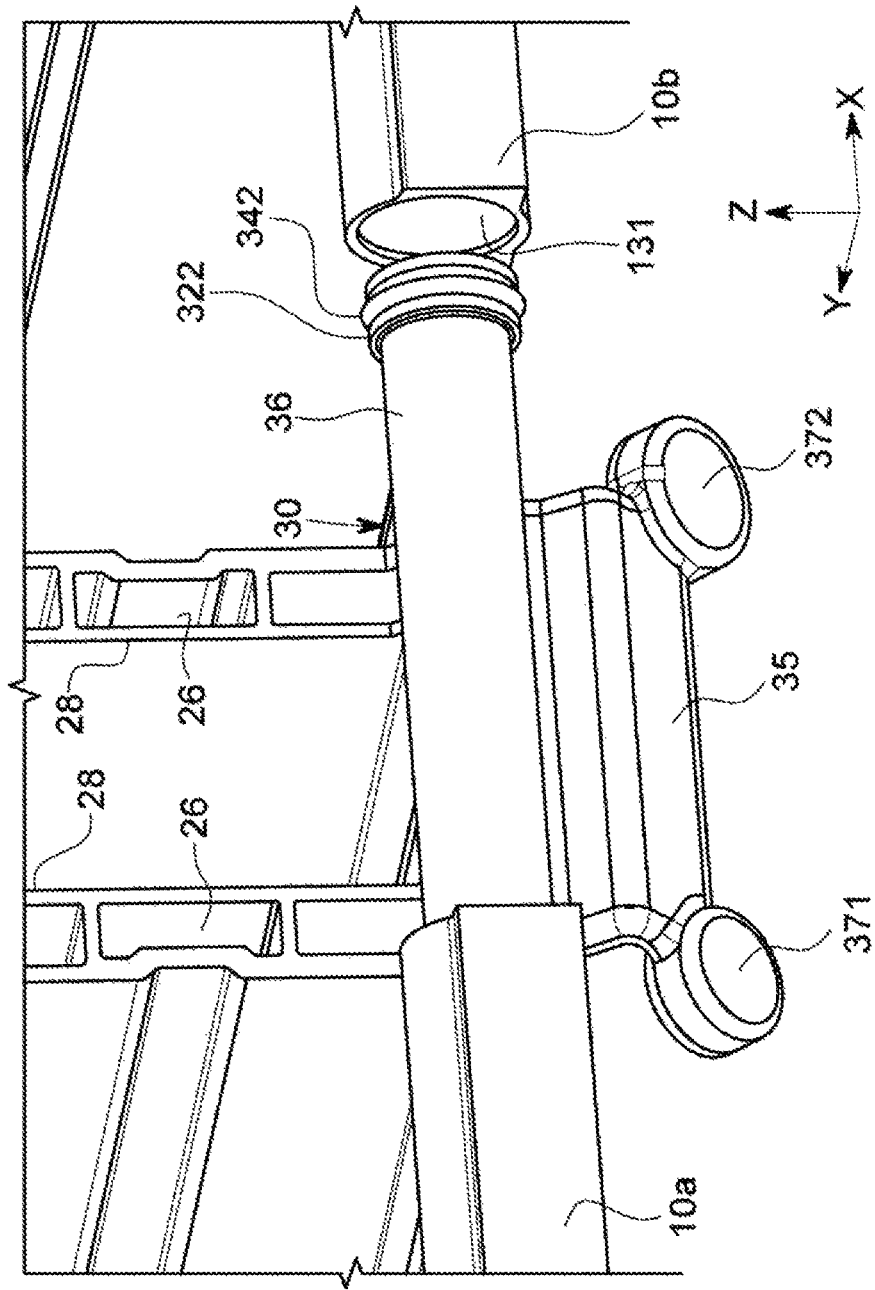
FIG. 10 illustrates a detailed view of a battery system housing of FIG. 9.
Figure 11:
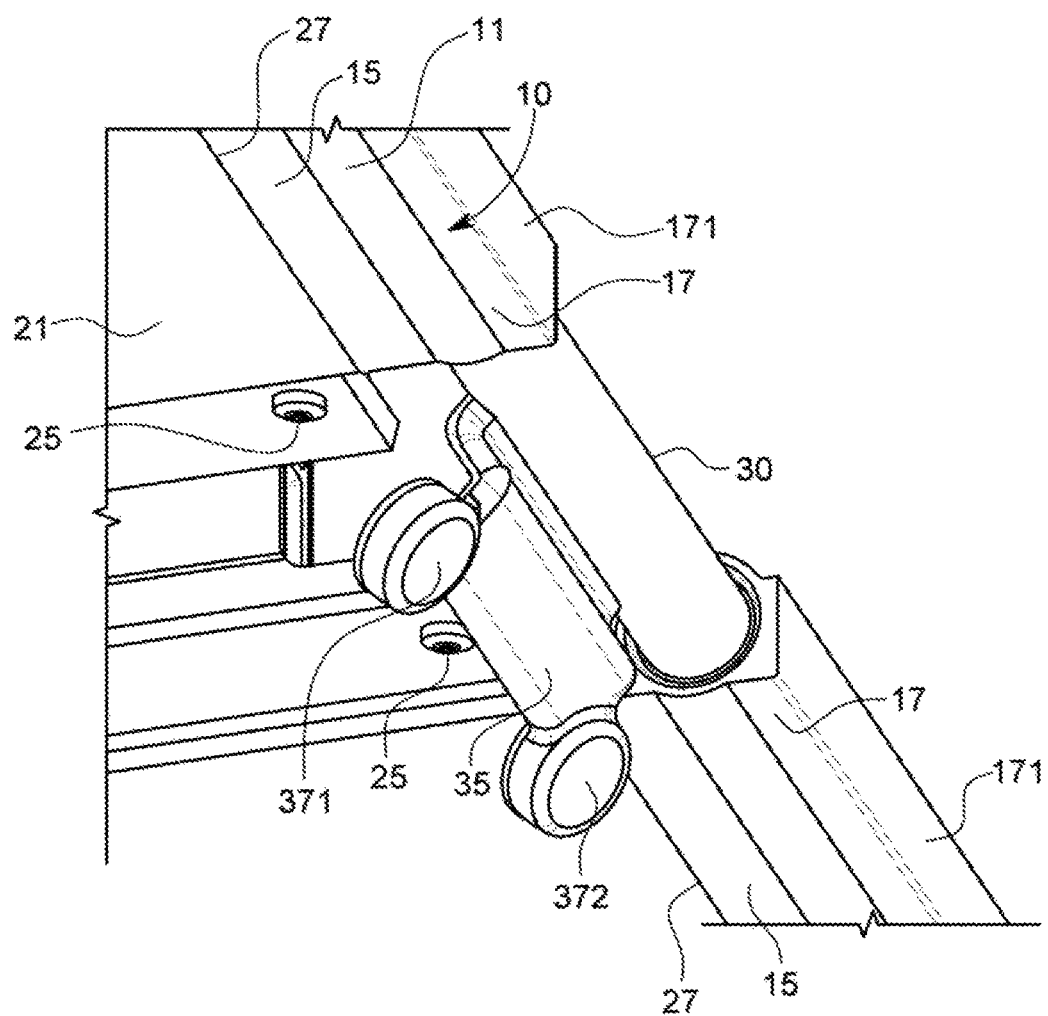
FIG. 11 illustrates another detailed view of a battery system housing of FIG. 9.

FIG. 9 illustrates a schematic perspective view of a battery system housing 40 according to an embodiment and FIGS. 10 and 11 illustrated detailed embodiments thereof. Essentially, the battery system housing 40 of the invention comprises a plurality of battery module housings 20 according to the invention, wherein pairs of the coolant interconnectors 10 welded to the bottom plates 21 of these battery module housings 20 are interconnected via the pipe coupling 30 of the present invention.

As illustrated in FIG. 9, a first pipe coupling 30a is configured to be inserted into the coolant inlet 131 of a second coolant distributor 10b, while being inserted into the first coolant distributor 10a between a first battery module housing 20a and a second battery module housing 20b. Further, a second pipe coupling 30b is configured to be inserted into the coolant outlet 132 of the second coolant distributor 30b, while being inserted into a third coolant distributor 10c between the second battery module housing 20b and a third battery module housing 20c. Therein, the axial extension of the bulged portions 321, 322 of the pipe coupling 30 exceeds the axial extension of the inlet connecting portion 181 and the outlet connecting portion of the coolant distributors 10. Hence, the pipe couplings 30 can be axially displaced for insertion and removal into the coolant distributors 10 of adjacent battery module housings 20 for connecting the battery module housings 20.

The axial displacement of a pipe coupling 30 is shown in more detail in FIG. 10. FIG. 10 further shows that the outer circumference of the bulged portion 322 of a coolant distributor 10 is adapted to inner diameter of the coolant channel 13 of a coolant distributor 10. Although the circumferential gasket 342 may exceed the inner diameter of the coolant channel 13 it can be inserted therein and provides a press-fit and tight sealing.

FIGS. 9 and 11 further show two screw heads 25 that protrude from a lower surface 212 of a bottom plate 21 of a battery module housing 20. By axially sliding the pipe couplings 30, adjacent coolant distributors 10 can be fluidly connected as both circumferential gaskets 341, 342 are inserted into the coolant channels 13 of the coolant distributors 10. In such axial position, the pipe couplings 30 can be rotated around their central axis until the torsion protection element 35 engages with the lower surfaces 212 of the bottom plates 21 of the adjacent battery module housings 20. Further, the design and dimension of the torsion protection element 35, particularly the position and dimension of the cover elements 371, 372 is adapted to the positions and the dimension of the screw heads 25 protruding from the lower surface 212 of the bottom plate 21. Hence, in the rotational state where the torsion protection element 35 engages with the bottom plate 21 of the battery module housing 20, the cover elements 371, 372 fittingly receive one of the screw heads 25, respectively. Hence, the pipe coupling 30 is secured against any further axial displacement, wherein the rotational state is secured by the torsion protection element 35 and the friction between the circumferential gaskets 341, 342 and the coolant channels 13 of the coolant distributors 10.

Although the invention has been explained in relation to its preferred embodiments as described above, it is to be understood that many other possible modifications and variations can be made without departing from the scope of the present invention. It is, therefore, contemplated that the appended claim or claims will cover such modifications and variations that fall within the scope of the invention.

REFERENCE SIGNS 10 coolant distributor
11 hollow profile
12 exterior wall
13 coolant channel
131 coolant inlet
132 coolant outlet
14 coolant junction
15 first exterior wall portion
151 plane first exterior surface
152 junction separators
16 coolant port
161 flange portion
162 port opening
17 second exterior wall portion
171 plane second exterior surface
181 inlet connecting portion
182 step portion
20 battery module housing
21 bottom plate
211 top surface of the bottom plate
212 lower surface of the bottom plate 22 coolant ducts
23 inlet opening
24 first lateral wall
25 screw head
26, 53 hollows
27 weld seam
28 side walls
29 duct separators
30 pipe coupling
31 molded hollow profile
32 bulged portion
33 terminal end
35 torsion protection element
36 exterior surface of the molded hollow profile
37 cover element
38 connection channel
40 battery system housing
50 battery module housing
51 bottom plate
52 side walls
54 coolant ducts
55 duct separator

The invention claimed is:

1. A coolant distributor for a battery module housing, the coolant distributor comprising:
an aluminum hollow profile extending lengthwise in a first direction and comprising a plurality of exterior wall portions enclosing a coolant channel fluidly connecting a coolant inlet and a coolant outlet along the first direction, the coolant channel having a uniform, circular cross section, a first one of the exterior wall portions having a larger wall thickness than a second one of the exterior wall portions, the first exterior wall portion having a coextruded bulged portion having an essentially rectangular cross section, the coolant channel having a uniform, circular cross section; and
a plurality of drilled and/or milled coolant junctions, each extending through the first exterior wall portion in a second direction and providing a fluid connection between the coolant channel and a coolant port,
wherein each of the coolant ports comprises a port opening in the first exterior wall portion and a flange portion surrounding the port opening,
wherein the port openings of the plurality of coolant junctions are aligned in the first direction,
wherein the port openings of the plurality of coolant junctions are aligned in the first direction,
wherein the second direction encloses an angle between 30° and 110° with the first direction, and
wherein the coolant distributor is a fully monolithic unit.

2. The coolant distributor of claim 1, wherein the coolant channel has a tubular profile and the plurality of port openings are disposed in a first planar exterior surface of the first exterior wall portion of the hollow profile.

3. The coolant distributor of claim 2, wherein a second exterior wall portion with a second planar exterior surface oriented parallel or perpendicular to the first planar exterior surface.

4. The coolant distributor of claim 3, wherein a cross-sectional thickness of the first exterior wall portion and the second exterior wall portion exceeds a cross-sectional thickness of a residual of the hollow profile.

5. The coolant distributor of claim 1, wherein the angle is 90°.

6. The coolant distributor of claim 1, wherein the first direction is disposed along a central axis of the hollow profile, and the second direction is disposed along a central axis of the coolant junction.

7. A method for manufacturing a fully monolithic coolant distributor for a battery module housing, the method comprising the steps of:
extruding an aluminum profile extending lengthwise in a first direction and comprising at least one exterior wall enclosing a coolant channel fluidly connecting a coolant inlet and a coolant outlet along the first direction, the coolant channel having a uniform, circular cross section, the at least one exterior wall having a coextruded bulged portion having an essentially rectangular cross section; and
forming a plurality of coolant junctions by milling and/or drilling through a first portion of the at least one exterior wall in a second direction for providing a fluid connection between the coolant channel and a coolant port,
wherein each of the coolant ports comprises a port opening in the first portion of the at least one exterior wall and a flange portion surrounding the port opening, the port openings of the plurality of coolant junctions are aligned in the first direction, and the second direction encloses an angle between 30° and 110° with the first direction.

8. The method of claim 7, further comprising the step of honing at least a portion of the coolant inlet and/or the coolant outlet for forming at least one of an inlet or outlet connecting portion with decreased exterior wall thickness.

9. A battery module housing, comprising:
a bottom plate with a top surface configured for supporting a plurality of battery cells and with a plurality of embedded coolant ducts extending through the bottom plate in a lengthwise direction of the bottom plate, each coolant duct fluidly connecting an inlet opening in a first lateral wall of the bottom plate with an outlet opening in a second lateral wall of the bottom plate; and
a first fully monolithic coolant distributor according to claim 1 welded to the first lateral wall of the bottom plate, wherein the first exterior wall portion sits tightly on the first lateral wall, each of the plurality of port openings is aligned with one of the plurality of inlet openings, and the plurality of coolant ducts are sealed against each other by the flange portions; and
a second fully monolithic coolant distributor according to claim 1 welded to the second lateral wall of the bottom plate, wherein the first exterior wall portion sits tightly on the second lateral wall, each of the plurality of port openings is aligned with one of the plurality of outlet openings, and the plurality of coolant ducts are sealed against each other by the flange portions.

10. The battery module housing according to claim 9, wherein the bottom plate has an extruded aluminum profile and wherein the coolant distributor has an extruded aluminum profile.

11. The battery module housing according to claim 9, wherein the second direction is perpendicular to the first direction and the embedded coolant ducts extend in the second direction.

12. A method for manufacturing a battery module housing, comprising the steps of:
extruding an aluminum bottom plate with a top surface configured for supporting a plurality of battery cells and with a plurality of embedded coolant ducts extending through the bottom plate in a lengthwise direction of the bottom plate, each coolant duct fluidly connecting an inlet opening in a first lateral wall of the bottom plate with an outlet opening in a second lateral wall of the bottom plate;

providing a first fully monolithic coolant distributor according to claim 1 and welding the coolant distributor to the first lateral wall of the bottom plate, such that the first exterior wall portion sits tightly on the first lateral wall, each of the plurality of port openings is aligned with one of the plurality of inlet openings, and the plurality of coolant ducts are sealed against each other by the flange portions; and providing a second fully monolithic coolant distributor according to claim 1 and welding the coolant distributor to the second lateral wall of the bottom plate, such that the first exterior wall portion sits tightly on the second lateral wall, each of the plurality of port openings is aligned with one of the plurality of outlet openings, and the plurality of coolant ducts are sealed against each other by the flange portions.

13. A battery system housing, comprising:

a plurality of battery module housings according to claim 9, each configured for comprising a battery module with a plurality of aligned battery cells disposed on a bottom plate of the battery module housing;

a plurality of pipe couplings interconnecting a first coolant distributor of a battery module housing with a second coolant distributor of an adjacent second battery module housing, wherein each of the pipe couplings comprises:

a molded hollow profile configured to form a joint coolant channel with the first coolant distributor and the second coolant distributor;

a first bulged portion at a first terminal end of the molded hollow profile with a cross-sectional form corresponding to the cross-sectional form of a hollow profile of the first coolant distributor and a first circumferential gasket, the first bulged portion being configured for being press-fitted into the coolant outlet of the first coolant distributor;

a second bulged portion at a second terminal end of the molded hollow profile with a cross-sectional form corresponding to the cross-sectional form of a hollow profile of the second coolant distributor and a second circumferential gasket, the second bulged portion being configured for being press-fitted into the coolant inlet of the second coolant distributor; and at least one torsion protection element protruding from an exterior surface of the molded hollow profile and being configured for contacting the bottom plate of at least one of the first and second battery module housing in at least one rotational state of the pipe coupling.

14. The battery system housing of claim 13, wherein the torsion protection element of each pipe coupling comprises a first cover element configured for fittingly receiving a first screw head protruding from the lower surface of the bottom plate of the first battery module housing and a second cover element configured for fittingly receiving a second screw head protruding from the lower surface of the bottom plate of the second battery module housing.

15. The battery system housing of claim 13, wherein at least one torsion protection element comprises at least one cover element configured for fittingly receiving at least one screw head protruding from the lower surface of the bottom plate of at least one of the first and second battery module housing.

16. The coolant distributor of claim 1, wherein the aluminum hollow profile is extruded.

17. A coolant distributor for a battery module housing, the coolant distributor comprising:

an extruded aluminum hollow profile extending lengthwise in a first direction and comprising at least one exterior wall enclosing a coolant channel fluidly connecting a coolant inlet and a coolant outlet along the first direction, the coolant channel having a uniform, circular cross section, the at least one exterior wall having a coextruded bulged portion having an essentially rectangular cross section; and a plurality of drilled and/or milled coolant junctions, each extending through a first portion of the at least one exterior wall at the bulged portion in a second direction and providing a fluid connection between the coolant channel and a coolant port, wherein each of the coolant ports comprises a port opening in the bulged portion and a flange portion surrounding the port opening, wherein the port openings of the plurality of coolant junctions are aligned in the first direction, wherein the port openings of the plurality of coolant junctions are aligned in the first direction, wherein the second direction encloses an angle between 30° and 110° with the first direction, and wherein the coolant distributor is a fully monolithic unit.

* * * * *

UNITED STATES PATENT AND TRADEMARK OFFICE
CERTIFICATE OF CORRECTION

PATENT NO. : 11,171,372 B2
APPLICATION NO. : 16/960854
DATED : November 9, 2021
INVENTOR(S) : Matthias Pucher et al.

Page 1 of 1

It is certified that error appears in the above-identified patent and that said Letters Patent is hereby corrected as shown below:

In the Claims

Column 17, Lines 47-50, Claim 1:
Delete "wherein the port openings of the plurality of coolant junctions are aligned in the first direction, wherein the port openings of the plurality of coolant junctions are aligned in the first direction," and
Insert -- wherein the port openings of the plurality of coolant junctions are aligned in the first direction, --

Column 20, approx. Lines 40-43, Claim 17:
Delete "wherein the port openings of the plurality of coolant junctions are aligned in the first direction, wherein the port openings of the plurality of coolant junctions are aligned in the first direction," and
Insert -- wherein the port openings of the plurality of coolant junctions are aligned in the first direction, --

Signed and Sealed this
Third Day of January, 2023

Katherine Kelly Vidal
*Director of the United States Patent and Trademark Office*